United States Patent
Kutsay

[15] 3,695,096
[45] Oct. 3, 1972

[54] STRAIN DETECTING LOAD CELL

[72] Inventor: Ali Umit Kutsay, 3520 Lewis Road, Newton Square, Pa. 19073

[22] Filed: April 20, 1970

[21] Appl. No.: 30,190

[52] U.S. Cl. ............................73/88.5 R, 73/141 A
[51] Int. Cl. .................................................G01l 1/18
[58] Field of Search.......73/88.5 R, 144, 141 A, 133, 73/136

[56] References Cited

UNITED STATES PATENTS

| 3,554,025 | 1/1971 | Andersson et al. | 73/141 A |
|---|---|---|---|
| 3,064,221 | 11/1962 | King | 73/141 A |
| 3,205,706 | 9/1965 | Tracy | 73/141 A |
| 3,272,006 | 9/1966 | Eckard | 73/141 A |
| 3,427,875 | 2/1969 | Saxe | 73/141 A |
| 3,426,586 | 2/1969 | Kadlec | 73/88.5 |
| 3,365,689 | 1/1968 | Kutsay | 338/5 |
| 2,413,797 | 1/1947 | Stone | 85/1 |
| 3,037,178 | 5/1962 | Pien | 338/5 |
| 3,448,424 | 6/1969 | Laimins | 338/5 |

FOREIGN PATENTS OR APPLICATIONS

| 140,593 | 5/1959 | U.S.S.R. | 73/133 |
|---|---|---|---|
| 198,735 | 6/1967 | U.S.S.R. | 73/88.5 |
| 209,017 | 7/1968 | U.S.S.R. | 73/88.5 |

*Primary Examiner*—Charles A. Ruehl
*Attorney*—Eugene E. Geoffrey, Jr.

[57] ABSTRACT

A strain detecting load cell which is adapted to replace or be readily interchangeable with coupling member such as a pin or bolt. The working dimensions of the cell and the part replaced are the same, except that the cell has short zones of slightly decreased diameter so that the shear strains are concentrated in these zones. An axial bore in the cell contains electrical strain gages attached to its circumferential wall within the concentrating zones and having leads for connection to exterior measuring instrumentation such as Wheatstone bridge equipment. The arrangement and orientation of the gages in the concentrating zones permit evaluation of the applied load both as to magnitude and direction.

9 Claims, 14 Drawing Figures

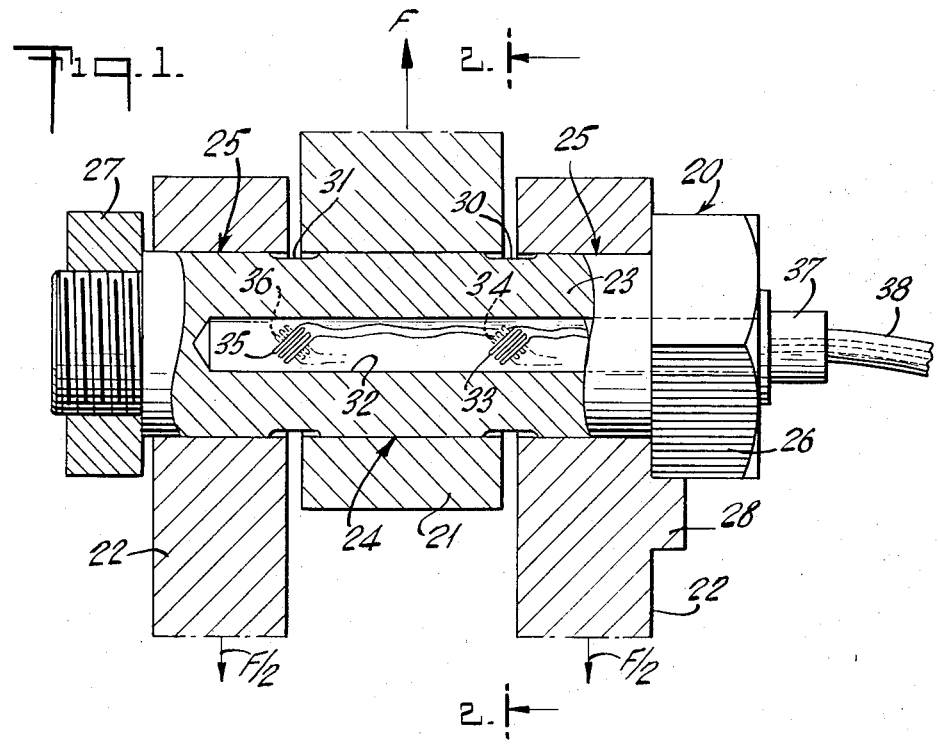
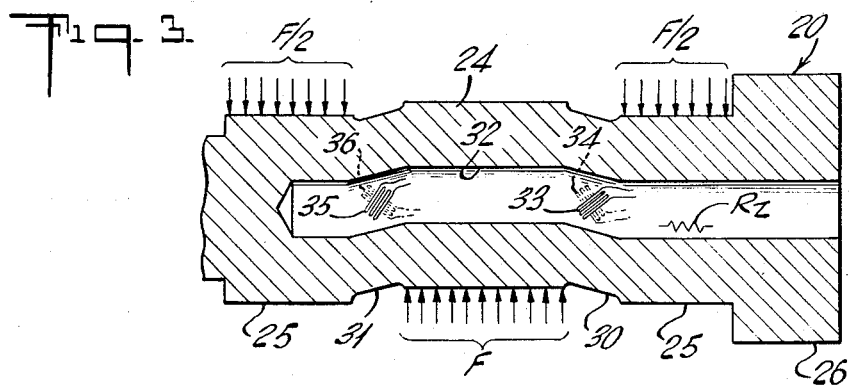
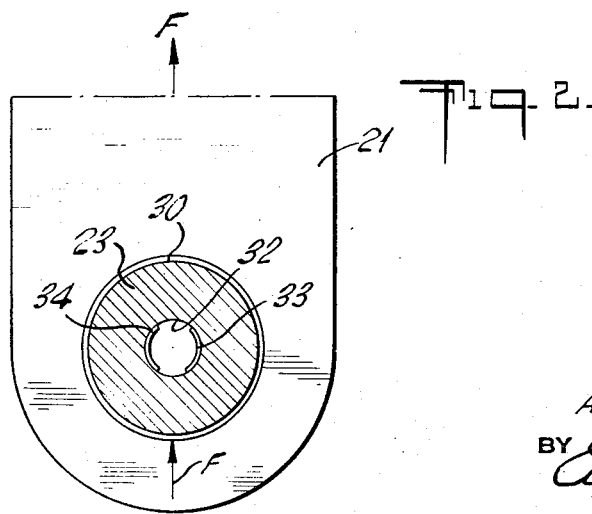
INVENTOR
ALI UMIT KUTSAY

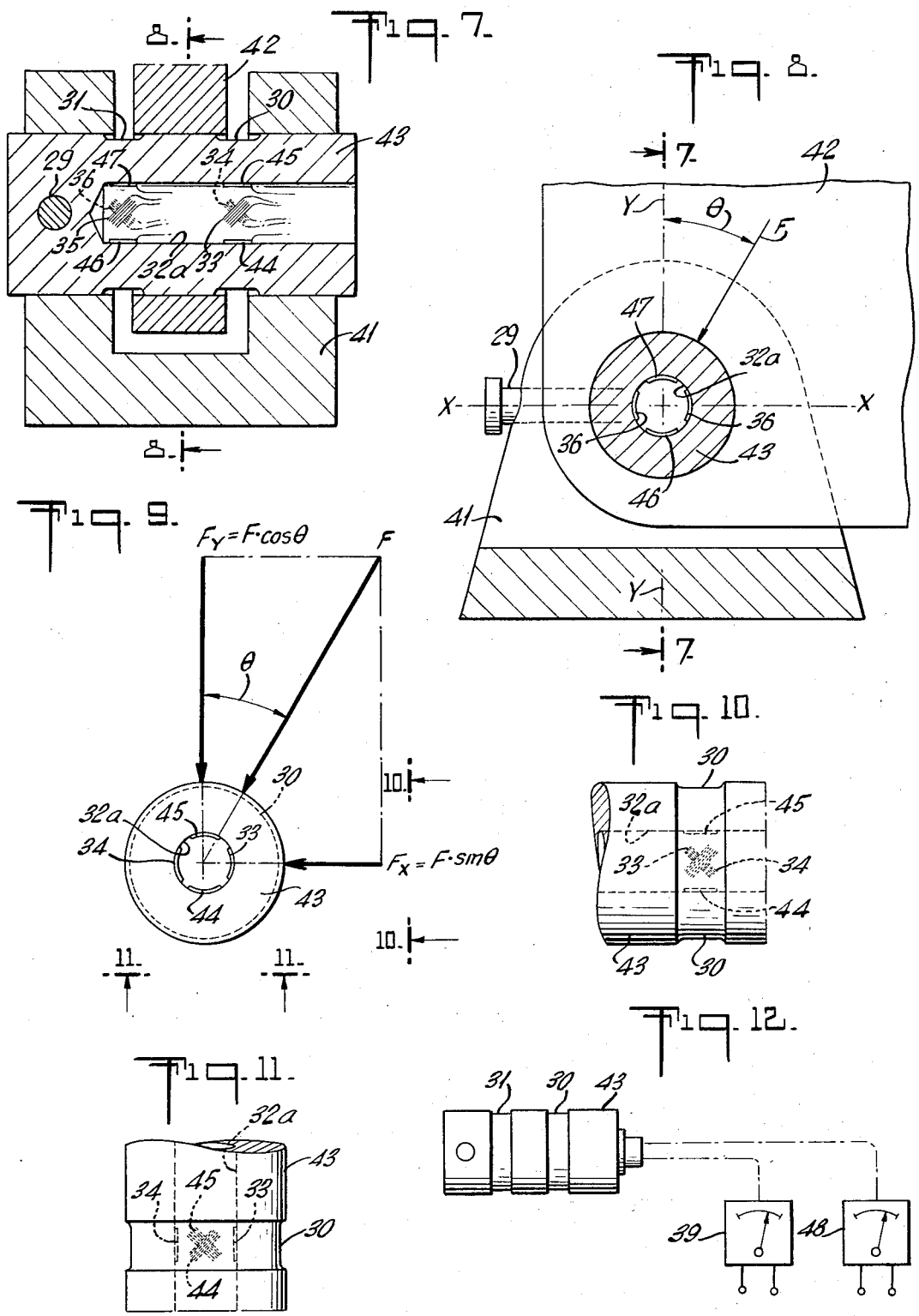

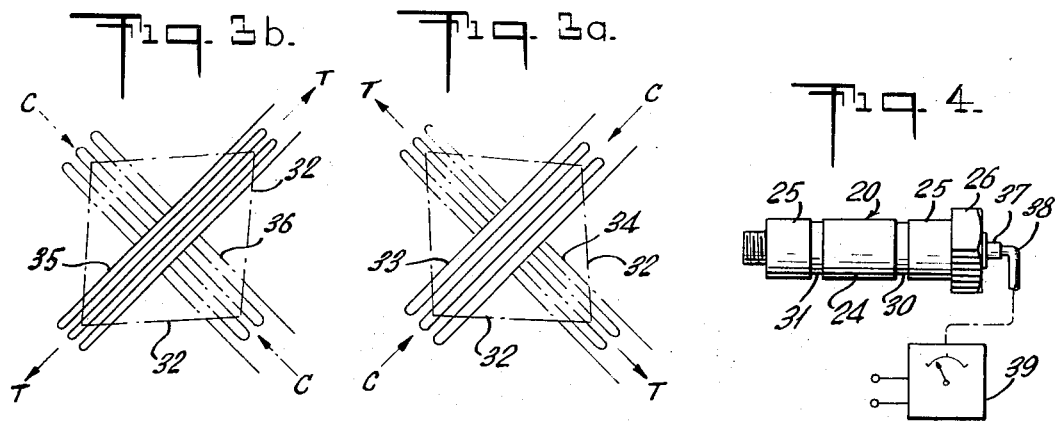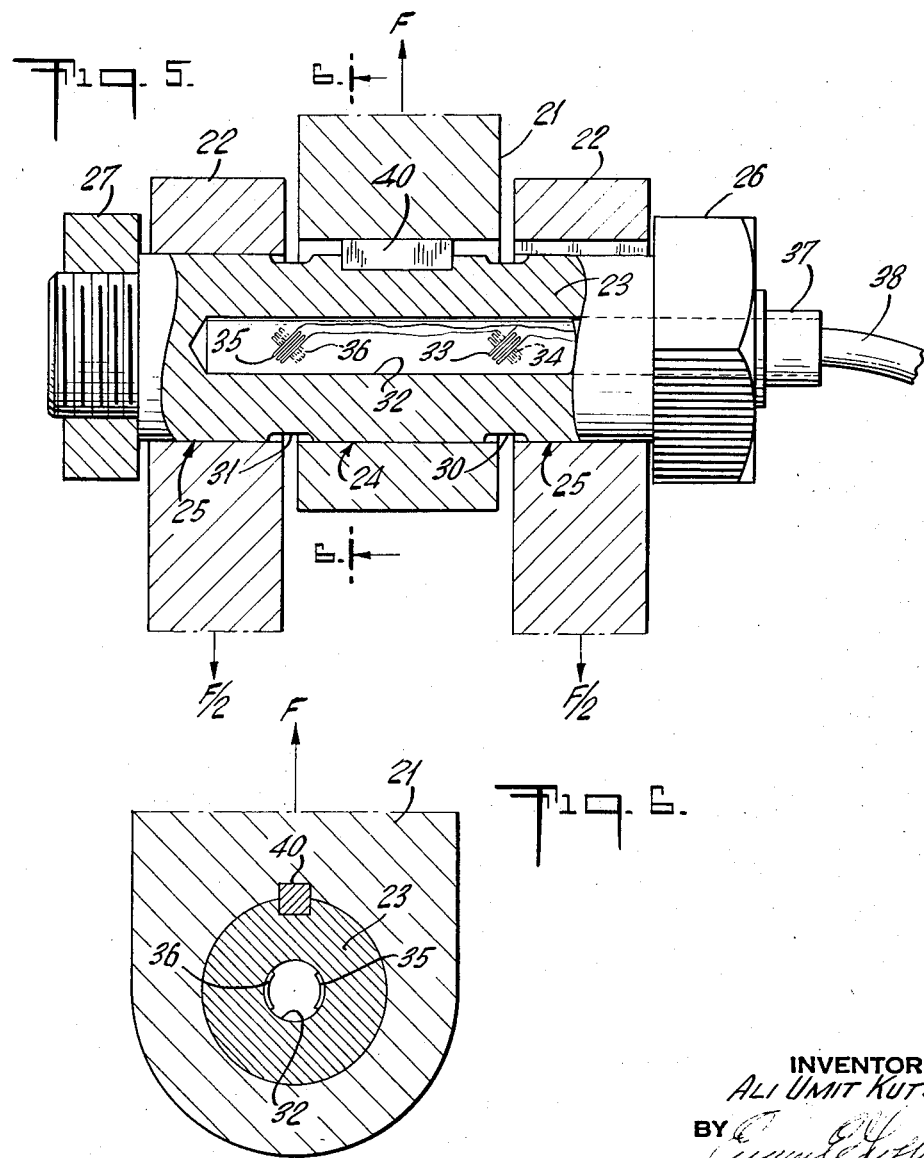

STRAIN DETECTING LOAD CELL

The present invention relates to improvements in strain detecting apparatus and is particularly directed to the ready application of electrical strain gage equipment to machine junctions employing pin members subject to stress in shear, as in cranes, hoists, conveyors, and the like.

In the field of heavy-duty machinery such as cranes, hoists, conveyors, etc., there are necessarily employed various junctures in which operational forces are transmitted or supported by pivotal pins, bolts, or local axle members, the latter as typically applied to rollers. Well-known examples are the clevis and yoke combinations using pivot pins or bolts subject to shearing stress, and in the case of rollers, short spanning axle pins also subject to shear. In many such installations, for instance in a large construction crane, certain pivotal joints are subjected to stresses which vary in magnitude and frequently also in direction during the course of an operation. While obviously these factors will normally have been taken into consideration in the initial design of the apparatus, it is not only generally desirable to measure them under actual working conditions but also, and perhaps even more significant, it is desirable to measure the forces transmitted and the directions of such forces.

In dealing with many other types of machine combinations, field determination of some stresses is successfully accomplished by application of electrical strain gages to stationary members, either by direct bonding or by the use of attachments carrying the gages. However, the necessities of design, spatial limitations, and operational conditions in the type of pivotal shear joints mentioned herein have hitherto prevented generally successful application of such conventional strain gage equipment thereto; principal factors have included undue complication and costs, requirement for radical design changes in the tested apparatus to provide additional clearances and/or protection for the gages, difficulty of installation, practical impossibility of accurate calibration in the field, and lack of available means to detect the angle of an applied load as well as its magnitude.

In view of the above, an object of the present invention is to provide a load cell device which is adapted either to replace or to be readily interchangeable with a primary junctional member subject to shear stress.

A further object is to provide a device of the above nature which has substantially the same major working dimensional conformation as that of the primary junctional member, and which is adapted in itself to perform all the normal operating functions of the said member.

A further object is to provide a load cell structure of the above type which is formed with zones of slightly reduced external dimension intermediate the exterior working surface areas, whereby shear strains produced in the cell by forces applied to the working surface areas may be concentrated in the intermediate zones.

A further object is to provide a load cell of the above nature formed with an axial bore, and including a plurality of electrical strain gages attached to the circumferential surface of the bore within the zones of shear concentration.

A further object is to provide a pivotal force transducer structure including a combination of internal strain gages arranged to detect simultaneously the mutually perpendicular radial components of shear strain produced by components of a force angularly applied to the transducer, whereby the magnitudes of the force components, the magnitude of the total applied force, and the applicational angle of the applied force may be ascertained.

Other objects and advantages of the invention will become more apparent from the following description and accompanying drawings forming part of the application.

In the drawings:

FIG. 1 is a longitudinal sectional view of the invention applied to a typical yoke and clevis junction;

FIG. 2 is a cross-sectional view of the same in the plane 2—2 of FIG. 1;

FIG. 3 is a semi-diagrammatic longitudinal section illustrating typical gage and force relationships occurring in the combination shown in FIGS. 1 and 2;

FIGS. 3a and 3b are enlarged diagrams illustrating the distortions of the gage elements under shear as applied in FIG. 3;

FIG. 4 illustrates the connection of exterior metering means to the device shown in FIGS. 1, 2, and 3;

FIG. 5 illustrates an alternative version of the apparatus shown in FIGS. 1 and 2;

FIG. 6 is a detail sectional view of FIG. 5 taken along the plane 6—6 thereof;

FIG. 7 is a longitudinal sectional view of the invention utilized at a junction subjected to a force applied at an unknown angle and/or of unknown magnitude;

FIG. 8 is a cross-section of FIG. 7 taken in the plane 8—8 thereof;

FIG. 9 illustrates in cross-section the typical relationship between force components and gage arrangement in the embodiment shown in FIGS. 7 and 8;

FIGS. 10 and 11 further illustrate the angular relationship between the various gage elements in the concentration zones of FIG. 7; and FIG. 12 is a diagram indicating typical electrical connections to exterior metering equipment for the embodiment shown in FIGS. 7 to 11.

Referring to FIG. 1, the numeral 20 denotes a load cell adapted to act as a transducer for a force F between a yoke 21 and a matching clevis 22, and which can be substituted for a plain bolt. The force-transmitting element of the cell comprises a generally cylindrical body 23 formed with a middle peripheral surface area 24 engaging the yoke 21 and flanking surface areas 25 similarly engaging the clevis 22. In accordance with normal practice, the tolerances between the parts are selected to prevent binding and to permit easy assembly and disassembly.

The bolt type cell 20 as illustrated is provided with a hexagonal head 26 and is retained by a nut 27. A small amount of end play is allowed to prevent the application of any significant longitudinal stress to the cell during service. If desired, a suitable retaining ring may be used instead of the nut 27. To prevent turning of the cell in the clevis 22, the head 26 is adapted to engage an abutment 28 on the adjacent leg of the clevis 22. The abutment, if not already provided in the original design of the machine to promote easy assembly of the joint, may be readily installed by welding or brazing. Obviously any other suitable means of preventing rotation may be employed, such as a cross pin 29 as shown in FIGS. 7 and 8.

Returning to FIG. 1, it will be seen that the middle working surface portion or area 24 of the body 23 is separated longitudinally from the flanking surface area portions 25 by narrow zones 30 and 31 of slightly reduced diameter, these zones spanning the regions of respective facing junctions between the yoke 21 and the clevis 22. It will be evident that when a force F is transmitted from the yoke 21 to the clevis 22 by the bolt cell 20, thus placing the latter in shear, the reduced diameters of the zones 30 and 31 cause the shearing stress and consequent strains to be concentrated therein, these effects being illustrated in exaggerated form in FIG. 3.

The cell body 23 is provided with an axial bore 32. In the form of the device shown in FIGS. 1 and 2, wherein the force F is of fixed known direction but of unknown magnitude, two strain gages 33 and 34 are bonded to the circumferential surface of the bore 30 in the concentration zone 30. These gages are situated opposite each other in a diammetrical alignment at right angles to the known direction of the force F, as shown in FIG. 2. The gages 33 and 34 are also arranged with their sensing direction at 45° relative to the axis of the body 23, but at 90° or crisscross relation to each other. A second pair of gages 35 and 36 is similarly disposed in the zone 31. Exterior connections from the gage units are provided through a suitable seal fitting 37 and flexible multi-conductor cable 38.

Referring to FIG. 3, it will be observed that the force F applied to the middle working surface 24 of the body 23 is opposed by joint resisting forces F/2, F/2 applied to the flanking surfaces 25,25. This force relationship sets up shearing stresses and resulting strains or distortions in the concentrating zones 30 and 31. U.S. Pat. No. 3,365,689 granted to Ali Umit Kutsay includes an extensive explanation of gaging geometry and electrical connections for shear force measurements, hence these details are not repeated herein except to note, in connection with FIGS. 3a and 3b, that the distortion shown in FIG. 3 changes the gage-holding elements of the bore surface 32 from their normally rectangular shape to the rhombic form illustrated. Thus when strain gages 33 and 36 are in compression C, the gages 34 and 35 will be under tension T. The gages are electrically joined via the connector 37 and cable 38 to exterior elements forming therewith the usual Wheatstone bridge type of measuring circuit, the exterior portion of the apparatus being indicated diagrammatically herein by the block 39 as shown in FIG. 4. The signals set up by the above noted strains in the gages cooperate to effect the characteristic bridge unbalance and consequent measuring indication of the applied force F.

The apparatus combination 39 may embody either simple indicating means or recording means, as desired. With regard to the Wheatstone bridge circuits mentioned, the various zero balance, temperature compensation, and bridge sensitivity resistors $R_z$ etc., required for use with a particular gage assembly, may be sealed or "potted" within the bore 32 (FIG. 3). In addition to the protection afforded the parts, this arrangement provides a load cell unit combination which is self-contained to a large degree, thus obviously promoting simplicity in installation, stability of calibration, and ready employment with a minimum of exterior instrumental requirements.

The foregoing embodiment, as noted, is particularly applicable to load measurement at a pin joint wherein the known direction of the applied force is fixed, thus allowing the cell to be retained in fixed position with its gages orientated for maximum response in a given direction. Under a second set of circumstances, wherein both the amount of the applied force and its direction are variable and hence unknown, but wherein it is desired to measure only the amount of the force irrespective of its direction, the arrangement shown in FIGS. 5 and 6 map be employed. In this embodiment the general combination is the same as that previously described, except that the load cell 20 is not restrained from rotation in the clevis 22, but is secured against rotation in the yoke 21 by suitable means such as a key 40. The pairs of gage units 33–34 and 35–36 disposed in mutually crisscross 45 degree operational relation to the axis of the cell body 23, are orientated at 90 degrees to the direction through which the yoke 21 is adapted to apply the force F. Thus the maximum response of the gaging combination to the applied force is uniformly available to measure the magnitude of the force without regard to changes in the angle of application.

The third set of operating conditions, as previously mentioned, consists of a situation in which a force of unknown magnitude is applied to a pin joint in an unknown radial direction, and in which it is desired to ascertain both the magnitude and direction of the load simultaneously. For this purpose the present invention provides means as typified by the embodiment shown in FIGS. 7 and 8. In the embodiment illustrated, the joint structure consists of a forked base bracket 41 to which a central yoke or lug member 42 is articulated by means of a cylindrical load cell 43. As previously noted, the cell may constitute a temporary gaging replacement for a normally used plain pin of identical essential working dimensions, or may if desired be itself employed as a permanent working component. The cell 43 is a headless pin and is restrained from rotation in the bracket 41 and from axial dislodgment by cross pin 29. For the subsequent analysis of the angular direction of force application, the reference line is taken as the vertical through the axial center of the cell 43 as shown in FIG. 8. This line is indicated as the Y-axis of coordinates. Using the same coordinate convention, the horizontal diametral direction through the cell center is indicated as the X-axis in FIG. 8.

The bore 32a of the cell body 43 has secured therein the same combinational set of gages 33, 34, 35 and 36 as previously described for the embodiment shown in FIG. 1 and the gages are similarly arranged to detect strains due to a force operating in a vertical direction, and the measured result is indicated by a Wheatstone bridge metering unit 39 as shown in FIG. 12. The bore 32a also contains a second set of gages 44, 45, 46, and 47. This second combination is the same in gage content and interrelation as the above described first set, but its bonded position in the bore is displaced circumferentially by 90 degrees from that of the first set. As a result, the second set of gages is responsive to horizontal rather than vertical forces. The gages 44, 45, etc., of the second set are connected into a second Wheatstone bridge metering combination 48, of FIG. 12, generally identical to the apparatus 29 but having no electrical connection therewith. At this point it is appropriate to note that vertical or Y-axis directional forces do not per se produce any indication by the metering unit 48, since the effects of such forces on the vertically aligned gages 44, 45, etc., are equal throughout and hence cancel each other in the bridge circuit. Similarly, horizontal or X-axis forces have no effect on the first metering unit 39, their entire significant effect being measured by the second unit 48. In view of the above relationships, for clarity and brevity in subsequent explanation, the metering combinations 39 and 48 may conveniently be referred to as the Y-meter and the X-meter, respectively.

In a typical operation, referring to FIG. 8, in which a force F of unknown magnitude is applied radially to the cell body 43 at an unknown angle $\eta$ from the vertical or Y-axis of reference, it is desired to ascertain both the magnitude of the force and its angle of application. The force F produces shear strain in the cell body 43 in the general manner illustrated in FIG. 3, but due to the angularity of application, the first and second sets of gages are affected not in proportion to the total force F, but rather in proportion to the latter's vertical and horizontal components $F_y$ and $F_x$ respectively, as indicated in FIG. 9. Employing the usual rectangular coordinate convention as noted, $F_y = F \cdot \cos \theta$, $F_x = F \cdot \sin \theta$, while $\tan \theta = F_x/F_y$. From these relationships, and further pursuant to the usual trigonometrical process, it will be evident that $\theta = \tan^{-1} F_x/F_y$ (the angle whose tangent is $F_x/F_y$), $F = F_x \cdot \text{cosecant } \theta$, or, $F = F_y \cdot \text{secant } \theta$.

Since in each case the essential related quantities $F_x$ and $F_y$ are disclosed or presented simultaneously by the X-meter 48 and the Y-meter 39 respectively, it is obvious that the device enables both the total magntidue of the force and the angle of its delivery to be readily ascertained or derived either by manual or automatic computation.

Throughout the foregoing description it will have been noted that during its gaging operation the device functions also as an essential working part of the machine itself rather than a mere attachment thereto. Thus the load cell at all times sustains and transmits the entire actual working shear forces occurring in the joint under test. Accordingly, the metered disclosures are the direct results of the full field working load itself and hence not dependent on fractional or token values supplied by various external mountings of the gaging elements. The advantages achieved are self-evident, not only in point of simplicity and accuracy, but also in providing "on-the-job" evaluation of shear stressed machine members not hitherto practically amenable to effective strain gaging techniques. With respect to the use of the load cell described herein either as a temporary, or if desired, permanent substitute for the plain pin which it replaces, the reduction in shear-resistant metal, due to the slightly reduced diameter of the zones 30 and 31 plus the presence of the relatively small central bore 32, is normally insufficient to be of any practical significance. However, if particular conditions call for a strict and very high factor of safety, the cell body obviously may be made of suitable material having sufficient additional intrinsic strength characteristics to fulfill the technical requirement.

Reference was previously made to U.S. Pat. No. 3,365,689, as furnishing a detailed explanation of how shear stresses may advantageously be detected by strain gage means. In another point of relevance, U.S. Pat. No. 2,873,341, discloses a method of bonding strain gages to a bore surface by including them in a pre-formed cartridge of bonding material, which is then installed bodily in the bore by pressing, shrink fitting, or the like.

For convenience in illustration, the line of reference or direction for the orientation of gages within the load cell bore in accordance with this invention has been taken as the vertical throughout FIGS. 1, 2, 3, etc., but obviously the sensitive planes, as determined by the circumferential positioning of the gages, may be arranged with respect to any other direction of reference which may be desired. Similarly, in addition to the 90-degree gage set spacing illustrated in FIGS. 7, 8, and 9, other circumferential spacings may be used if components of forces are required in other specific directions. In other words, while the invention has been set forth in typical preferred form, it is not limited to the precise embodiments illustrated, as various modifications may be made without departing from the spirit of invention as defined in the appended claims.

What is claimed is:

1. In apparatus for gaging stress in a machine junction having a load applying coupler member and a load sustaining coupler member, in combination, a substantially cylindrical load cell body adapted to join said members in conventional coupling pin relationship and being subjected to shear strains when transmitting operating load stress between said coupler members, said cell body having longitudinally spaced peripheral areas adapted to engage said respective coupler members and zones of reduced cross-sectional areas intermediate said peripheral engaging areas, whereby said shear strains may be concentrated in said intermediate zones, means forming an axial bore in said cell body, a set of electrical strain gages operationally bonded directly to the circumferential wall of said bore within said concentration zones in an orientation pattern providing said gages of said set with a maximum degree of collective response to straining force affecting said cell body in a predetermined radial reference direction, means to anchor said cell body against rotation in one of said coupler members, whereby said reference direction may be fixed with respect to said one coupler member, and means to meter the collective response of said gages to said straining force.

2. Apparatus according to claim 1 wherein said anchoring means is adapted to anchor said cell body in said load sustaining coupler member.

3. Apparatus according to claim 2 including a seal fitting at the outer end of said bore and flexible exterior means for completing electrical connection of said gages into said metering means.

4. Apparatus according to claim 2 including a second set of strain gages operationally secured to said wall of said bore in circumferential displacement from said first set of gages, whereby said second set of gages may be of maximum responsiveness to straining force in a second predetermined radial reference direction angularly displaced from said first reference direction, and means to meter response of said second set of gages independently of said first metering means.

5. Apparatus according to claim 1 wherein said anchoring means is adapted to anchor said cell body in said load applying coupler member with said reference direction corresponding to the line of load application by said applying member to said cell body, whereby said set of gages may respond to the full applied load independently of the radial angle of application of said load to said junction.

6. Apparatus according to claim 1 wherein said load cell body is of bolt formation, and wherein said anchoring means comprises a head on said body having a transverse flat face adapted to rotationally abut a part of said one coupler member.

7. Apparatus according to claim 1 wherein said set of strain gages includes a pair of said gages disposed in each of said concentrating zones, the two gages of each pair being arranged on opposite sides of the longitudinal axis of said bore with their directions of sensitivity at 45 degrees with the direction of said axis and in crisscross directional relation to each other.

8. Apparatus according to claim 1 including a seal fitting at the outer end of said bore and flexible exterior means for completing electrical connection of said gages into said metering means.

9. Apparatus according to claim 1 including a second set of strain gages operationally secured to said wall of said bore in circumferential displacement from said first set of gages, whereby said second set of gages may be of maximum responsiveness to straining force in a second predetermined radial reference direction angularly displaced from said first reference direction, and means to meter response of said second set of gages independently of said first metering means.

* * * * *